United States Patent
Vosgueritchian et al.

(10) Patent No.: US 10,139,294 B2
(45) Date of Patent: *Nov. 27, 2018

(54) STRAIN SENSORS IN AN ELECTRONIC DEVICE

(71) Applicant: Apple Inc., Cupertino, CA (US)

(72) Inventors: Michael Vosgueritchian, San Francisco, CA (US); John Stephen Smith, San Jose, CA (US); Sinan Filiz, Sunnyvale, CA (US); James E. Pedder, Thame (GB); Tingjun Xu, Cupertino, CA (US); Xiaonan Wen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/457,992

(22) Filed: Mar. 13, 2017

(65) Prior Publication Data

US 2017/0191884 A1 Jul. 6, 2017

Related U.S. Application Data

(63) Continuation of application No. 14/823,910, filed on Aug. 11, 2015, now Pat. No. 9,612,170.
(Continued)

(51) Int. Cl.
*G01L 1/22* (2006.01)
*G06F 3/041* (2006.01)
(Continued)

(52) U.S. Cl.
CPC ............... *G01L 1/225* (2013.01); *G01L 1/22* (2013.01); *G01L 1/2287* (2013.01); *G06F 3/045* (2013.01); *G06F 3/0414* (2013.01); *G06F 3/0488* (2013.01)

(58) Field of Classification Search
CPC ..... G01L 1/225; G01L 1/2287; G06F 3/0414; G06F 3/045
(Continued)

(56) References Cited

U.S. PATENT DOCUMENTS 3,745,502 A 7/1973 Watanabe
3,876,912 A 4/1975 Sanders
(Continued)

FOREIGN PATENT DOCUMENTS

CN 1527933 A 9/2004
CN 1796955 7/2006
(Continued)

OTHER PUBLICATIONS

Bau, et al., "TeslaTouch: Electrovibration for Touch Surfaces," UIST'10, Oct. 3-6, 2010, New York, New York USA, 10 pages.
(Continued)

*Primary Examiner* — Max Noori
(74) *Attorney, Agent, or Firm* — Brownstein Hyatt Farber Schreck, LLP

(57) ABSTRACT

One or more strain sensors can be included in an electronic device. Each strain sensor includes a strain sensitive element and one or more strain signal lines connected directly to the strain sensitive element. The strain sensor(s) are used to detect a force that is applied to the electronic device, to a component in the electronic device, and/or to an input region or surface of the electronic device. A strain sensitive element is formed or processed to have a first gauge factor and the strain signal line(s) is formed or processed to have a different second gauge factor. Additionally or alternatively, a strain sensitive element is formed or processed to have a first conductance and the strain signal line(s) is formed or processed to have a different second conductance.

19 Claims, 10 Drawing Sheets

Related U.S. Application Data

(60) Provisional application No. 62/195,030, filed on Jul. 21, 2015.

(51) Int. Cl.
 *G06F 3/045* (2006.01)
 *G06F 3/0488* (2013.01)

(58) Field of Classification Search
 USPC .................................................. 73/862.045
 See application file for complete search history.

(56) References Cited

U.S. PATENT DOCUMENTS

| | | |
|---|---|---|
| 4,345,477 A | 8/1982 | Johnson |
| 4,423,640 A | 1/1984 | Jetter |
| 4,516,112 A | 5/1985 | Chen |
| 4,634,917 A | 1/1987 | Dvorsky et al. |
| 4,695,963 A | 9/1987 | Sagisawa |
| 4,951,510 A | 8/1990 | Holm-Kennedy et al. |
| 5,481,905 A | 1/1996 | Pratt |
| 5,673,041 A | 9/1997 | Chatigny et al. |
| 5,708,460 A | 1/1998 | Young |
| 5,790,215 A * | 8/1998 | Sugahara ............ G02F 1/13475 349/111 |
| 5,915,285 A | 6/1999 | Sommer |
| 6,288,829 B1 | 9/2001 | Kimura |
| 6,369,865 B2 | 4/2002 | Hinata |
| 6,386,023 B1 | 4/2002 | Sajna et al. |
| 6,812,161 B2 | 11/2004 | Heremans |
| 6,973,837 B2 | 12/2005 | Barnett |
| 7,154,481 B2 | 12/2006 | Cross et al. |
| 7,176,897 B2 | 2/2007 | Roberts |
| 7,190,350 B2 | 3/2007 | Roberts |
| 7,196,694 B2 | 3/2007 | Roberts |
| 7,211,885 B2 | 5/2007 | Nordal et al. |
| 7,331,245 B2 | 2/2008 | Nishimura |
| 7,392,716 B2 | 7/2008 | Wilner |
| 7,441,467 B2 | 10/2008 | Bloom |
| 7,456,823 B2 | 11/2008 | Poupyrev et al. |
| 7,511,702 B2 | 3/2009 | Hotelling |
| 7,538,760 B2 | 5/2009 | Hotelling et al. |
| 7,707,894 B2 | 5/2010 | Sumigawa |
| 7,724,248 B2 | 5/2010 | Saito |
| 7,726,199 B2 | 6/2010 | Shkel et al. |
| 7,755,616 B2 | 7/2010 | Jung et al. |
| 7,800,592 B2 | 9/2010 | Kerr et al. |
| 7,903,091 B2 | 3/2011 | Lee |
| 7,992,448 B2 | 8/2011 | Shimazu |
| 8,020,456 B2 | 9/2011 | Liu et al. |
| 8,050,876 B2 | 11/2011 | Feen et al. |
| 8,056,421 B2 | 11/2011 | Sumigawa |
| 8,077,154 B2 | 12/2011 | Emig et al. |
| 8,087,087 B1 | 12/2011 | van Oorschot et al. |
| 8,132,468 B2 | 3/2012 | Radivojevic |
| 8,243,225 B2 | 8/2012 | Kai et al. |
| 8,266,971 B1 | 9/2012 | Jones |
| 8,305,358 B2 | 11/2012 | Klighhult et al. |
| 8,421,483 B2 | 4/2013 | Klinghult et al. |
| 8,434,369 B2 | 5/2013 | Hou et al. |
| 8,456,430 B2 | 6/2013 | Oliver et al. |
| 8,482,545 B2 | 7/2013 | King-Smith et al. |
| 8,519,974 B2 | 8/2013 | Berggren |
| 8,531,429 B2 | 9/2013 | Chang |
| 8,605,053 B2 | 12/2013 | Murphy et al. |
| 8,640,549 B2 | 2/2014 | Inamori |
| 8,648,816 B2 | 2/2014 | Homma et al. |
| 8,669,952 B2 | 3/2014 | Hashimura et al. |
| 8,669,962 B2 | 3/2014 | Kuan |
| 8,692,646 B2 | 4/2014 | Lee et al. |
| 8,695,433 B2 | 4/2014 | Shimazu |
| 8,711,128 B2 | 4/2014 | Small et al. |
| 8,780,060 B2 | 7/2014 | Maschmeyer et al. |
| 8,780,074 B2 | 7/2014 | Castillo et al. |
| 8,780,543 B2 | 7/2014 | Molne et al. |
| 8,878,803 B2 | 11/2014 | Kimura et al. |
| 8,982,088 B2 | 3/2015 | Kung |
| 8,988,384 B2 | 3/2015 | Krah et al. |
| 9,007,333 B1 | 4/2015 | Wilson |
| 9,057,653 B2 | 4/2015 | Schediwy |
| 9,024,910 B2 | 5/2015 | Stephanou et al. |
| 9,024,918 B2 | 5/2015 | Cok |
| 9,030,427 B2 | 5/2015 | Yasumatsu |
| 9,063,599 B2 | 6/2015 | Yanagi et al. |
| 9,081,460 B2 | 7/2015 | Jeong et al. |
| 9,099,971 B2 | 8/2015 | Lynn et al. |
| 9,110,532 B2 | 8/2015 | Ando et al. |
| 9,116,569 B2 | 8/2015 | Stacy et al. |
| 9,116,570 B2 | 8/2015 | Lee et al. |
| 9,128,547 B2 | 9/2015 | Kodani et al. |
| 9,134,826 B2 | 9/2015 | Andoh |
| 9,158,407 B2 | 10/2015 | Coulson |
| 9,182,849 B2 | 11/2015 | Huang et al. |
| 9,182,859 B2 | 11/2015 | Coulson et al. |
| 9,200,970 B2 | 12/2015 | Kodani et al. |
| 9,223,162 B2 | 12/2015 | DeForest et al. |
| 9,223,445 B2 | 12/2015 | Sleeman et al. |
| 9,246,486 B2 | 1/2016 | Yang et al. |
| 9,262,002 B2 | 2/2016 | Momeyer et al. |
| 9,292,115 B2 | 3/2016 | Kauhanen et al. |
| 9,304,348 B2 | 4/2016 | Jang |
| 9,329,719 B2 | 5/2016 | Molne et al. |
| 9,360,977 B2 | 6/2016 | Aberg |
| 9,367,173 B2 | 6/2016 | Setlak |
| 9,383,848 B2 | 7/2016 | Daghigh |
| 9,417,696 B2 | 8/2016 | DeLuca |
| 9,417,725 B1 | 8/2016 | Watazu et al. |
| 9,454,268 B2 | 9/2016 | Badaye et al. |
| 9,459,734 B2 | 10/2016 | Day |
| 9,466,783 B2 | 10/2016 | Olien et al. |
| 9,477,342 B2 | 10/2016 | Daverman et al. |
| 9,501,167 B2 | 11/2016 | Day |
| 9,507,456 B2 | 11/2016 | Watazu et al. |
| 9,519,378 B2 | 12/2016 | Watazu et al. |
| 9,542,028 B2 | 1/2017 | Filiz et al. |
| 9,557,857 B2 | 1/2017 | Schediwy |
| 9,562,814 B2 | 2/2017 | Kulkarni et al. |
| 9,563,317 B2 | 2/2017 | Sleeman et al. |
| 9,612,170 B2 * | 4/2017 | Vosgueritchian ....... G01L 1/225 |
| 9,639,224 B2 | 5/2017 | Lee |
| 9,658,722 B2 | 5/2017 | Schwartz |
| 9,665,200 B2 | 5/2017 | Filiz et al. |
| 9,690,408 B1 | 6/2017 | Krah |
| 9,690,414 B2 | 6/2017 | Kano et al. |
| 9,729,730 B2 | 8/2017 | Levesque et al. |
| 9,791,968 B2 | 10/2017 | Yang |
| 9,841,850 B2 | 12/2017 | Schediwy et al. |
| 9,864,450 B2 | 1/2018 | Watazu et al. |
| 9,881,577 B2 | 1/2018 | Wang et al. |
| 9,916,942 B2 | 3/2018 | Shedletsky |
| 10,007,380 B2 | 6/2018 | Yoon et al. |
| 10,032,592 B2 | 7/2018 | Brooks et al. |
| 2002/0149571 A1 | 10/2002 | Roberts |
| 2006/0043508 A1 | 3/2006 | Ohta et al. |
| 2007/0159561 A1 | 7/2007 | Chien |
| 2008/0165159 A1 | 7/2008 | Soss et al. |
| 2008/0218488 A1 | 9/2008 | Yang et al. |
| 2009/0002199 A1 | 1/2009 | Lainonen et al. |
| 2009/0189866 A1 | 7/2009 | Haffenden et al. |
| 2009/0316380 A1 | 12/2009 | Armstrong |
| 2010/0103115 A1 | 4/2010 | Hainzl |
| 2010/0117809 A1 | 5/2010 | Dai et al. |
| 2010/0123686 A1 | 5/2010 | Klinghult et al. |
| 2011/0045285 A1 | 2/2011 | Saiki et al. |
| 2011/0248839 A1 | 10/2011 | Kwok et al. |
| 2011/0261021 A1 | 10/2011 | Modarres et al. |
| 2011/0285660 A1 | 11/2011 | Prabhu et al. |
| 2012/0019448 A1 | 1/2012 | Pitkanen et al. |
| 2012/0038577 A1 | 2/2012 | Brown et al. |
| 2012/0105367 A1 | 5/2012 | Son et al. |
| 2012/0127136 A1 | 5/2012 | Schneider et al. |
| 2012/0154299 A1 | 6/2012 | Hsu et al. |
| 2012/0188198 A1 | 7/2012 | Jeong et al. |
| 2012/0293491 A1 | 11/2012 | Wang et al. |

(56) References Cited

U.S. PATENT DOCUMENTS

| | | | |
|---|---|---|---|
| 2013/0074988 A1 | 3/2013 | Chou | |
| 2013/0082970 A1 | 4/2013 | Frey et al. | |
| 2013/0141365 A1 | 6/2013 | Lynn et al. | |
| 2013/0147739 A1 | 6/2013 | Aberg et al. | |
| 2013/0154933 A1 | 6/2013 | Sheik-Nainar | |
| 2013/0215056 A1 | 8/2013 | Johansson et al. | |
| 2013/0222306 A1 | 8/2013 | Aberg et al. | |
| 2013/0328803 A1 | 12/2013 | Fukushima et al. | |
| 2013/0333922 A1* | 12/2013 | Kai | G06F 3/045 174/250 |
| 2014/0085253 A1 | 3/2014 | Leung et al. | |
| 2014/0118635 A1 | 5/2014 | Yang | |
| 2014/0191973 A1 | 7/2014 | Zellers et al. | |
| 2014/0327847 A1 | 11/2014 | Park et al. | |
| 2015/0002452 A1 | 1/2015 | Klinghult | |
| 2015/0101849 A1 | 4/2015 | Bockmeyer et al. | |
| 2015/0116260 A1 | 4/2015 | Hoen et al. | |
| 2015/0242037 A1 | 8/2015 | Pedder et al. | |
| 2015/0268725 A1 | 9/2015 | Levesque et al. | |
| 2015/0301684 A1 | 10/2015 | Shimamura | |
| 2015/0331517 A1 | 11/2015 | Filiz et al. | |
| 2016/0003697 A1 | 1/2016 | Okamoto et al. | |
| 2016/0033389 A1 | 2/2016 | Serpe | |
| 2016/0034073 A1 | 2/2016 | Andoh | |
| 2016/0035290 A1 | 2/2016 | Kim et al. | |
| 2016/0041672 A1 | 2/2016 | Hoen et al. | |
| 2016/0048266 A1 | 2/2016 | Smith et al. | |
| 2016/0062517 A1* | 3/2016 | Meyer | G06F 3/0414 345/173 |
| 2016/0077649 A1 | 3/2016 | Ando et al. | |
| 2016/0117035 A1 | 4/2016 | Watazu et al. | |
| 2016/0132151 A1 | 5/2016 | Watazu et al. | |
| 2016/0147353 A1 | 5/2016 | Filiz et al. | |
| 2016/0306481 A1 | 10/2016 | Filiz et al. | |
| 2016/0357297 A1 | 12/2016 | Picciotto et al. | |
| 2017/0031495 A1 | 2/2017 | Smith | |
| 2017/0075465 A1 | 3/2017 | Pedder et al. | |
| 2017/0090638 A1 | 3/2017 | Vosgueritchian et al. | |
| 2017/0090655 A1 | 3/2017 | Zhang et al. | |
| 2017/0261387 A1 | 9/2017 | Vosgueritchian et al. | |
| 2017/0269757 A1 | 9/2017 | Filiz et al. | |
| 2017/0285864 A1 | 10/2017 | Pedder et al. | |
| 2018/0059839 A1 | 3/2018 | Kim et al. | |
| 2018/0074638 A1 | 3/2018 | Chiang et al. | |

FOREIGN PATENT DOCUMENTS

| | | |
|---|---|---|
| CN | 1860432 | 11/2006 |
| CN | 101017419 | 8/2007 |
| CN | 101071354 | 11/2007 |
| CN | 101201277 A | 6/2008 |
| CN | 101243383 | 8/2008 |
| CN | 101950224 | 1/2011 |
| CN | 102012772 | 4/2011 |
| CN | 102047088 | 5/2011 |
| CN | 102165400 | 8/2011 |
| CN | 102175362 A | 9/2011 |
| CN | 102368191 | 3/2012 |
| CN | 102460351 | 5/2012 |
| CN | 102591519 | 7/2012 |
| CN | 102822779 | 12/2012 |
| CN | 103026327 | 4/2013 |
| CN | 103069365 | 4/2013 |
| CN | 103197821 | 7/2013 |
| CN | 103336562 | 10/2013 |
| CN | 103582807 | 2/2014 |
| CN | 204461655 U | 7/2015 |
| CN | 204576454 U | 8/2015 |
| CN | 105444662 | 3/2016 |
| EP | 0332365 | 9/1989 |
| EP | 0467562 | 1/1992 |
| EP | 1840714 | 10/2007 |
| EP | 2120136 | 11/2009 |
| EP | 2381340 | 10/2011 |
| EP | 2629075 | 8/2013 |
| FR | 2907563 | 4/2008 |
| JP | 201039458 A | 2/2010 |
| JP | 2010197066 | 9/2010 |
| WO | WO 96/038833 | 12/1996 |
| WO | WO 02/035461 | 5/2002 |
| WO | WO 07/074800 | 7/2007 |
| WO | WO 08/076393 | 6/2008 |
| WO | WO 11/156447 | 12/2011 |
| WO | WO 12/168892 | 12/2012 |
| WO | WO 13/177322 | 11/2013 |
| WO | WO 15/106183 | 7/2015 |
| WO | WO 15/158952 | 10/2015 |
| WO | WO 16/029354 | 3/2016 |

OTHER PUBLICATIONS

Feist, "Samsung snags patent for new pressure sensitive touchscreens," posted on AndroidAuthority.com at URL: http://www.androidauthority.com/samsung-patent-pressure-sensitive-touchscreens-354860, Mar. 7, 2014, 1 page.

Rausch, "Printed piezoresistive strain sensors for monitoring of light-weight structures," Sensor+Test Conferences 2011—Sensor Proceedings, pp. 216-220.

Schweizer, "Electrical characterization and investigation of the piezoresistive effect of PEDOT:PSS thin films," A Thesis Presented to the Academic Faculty In Partial Fulfillment of the Requirements for the Degree Master of Science of Electrical and Computer Engineering, Georgia Institute of Technology, Apr. 2005, 89 pages.

Takamatsu, et al., "Transparent conductive-polymer strain sensors for touch input sheets of flexible displays," *Journal of Micromechanics and Microengineering*, vol. 20, 2010, 6 pages.

Tsai, et al., "Fabrication of Graphene-based Micro Strain Gauge," NPL Management Ltd.—Internal, Oct. 15-16, 2012, 1 page.

\* cited by examiner

STRAIN SENSORS IN AN ELECTRONIC DEVICE

CROSS-REFERENCE TO RELATED APPLICATIONS

This application is a continuation of U.S. patent application Ser. No. 14/823,910, filed Aug. 11, 2015, and entitled "Transparent Strain Sensors in an Electronic Device," which claims the benefit under 35 U.S.C. § 119(e) of U.S. Provisional Patent Application No. 62/195,030, filed on Jul. 21, 2015, and entitled "Transparent Strain Sensors in an Electronic Device," both of which are incorporated by reference as if fully disclosed herein.

FIELD

Embodiments described herein generally relate to electronic devices. More particularly, the present embodiments relate to one or more transparent strain sensors in an electronic device.

BACKGROUND

Strain gauges or sensors are used to detect or measure strain on an object. Typically, the electrical resistance of a strain sensor varies in proportion to the compression and tension forces it is experiencing. The gauge factor of a strain sensor represents the sensitivity of the material to strain. In other words, the gauge factor indicates how much the resistance of the strain sensor changes with strain. The higher the gauge factor, the larger the change in resistance. Higher gauge factors allow a greater range of strain to be detected and measured.

In some situations, it is desirable for the strain sensors to be made of a transparent material. For example, transparent strain sensors may be used when the strain sensors are located in an area where the strain sensors can be detected visually by a user (e.g., though a display). However, some materials that are used to form transparent strain sensors have low or zero gauge factors.

SUMMARY

One or more transparent strain sensors can be included in an electronic device. As used herein, the term "strain sensor" refers to a strain sensitive element and the one or more strain signal lines that connect directly to the strain sensitive element. In one embodiment, the strain sensor(s) are used to detect a force that is applied to the electronic device, to a component in the electronic device, such as an input button, and/or to an input region or surface of the electronic device. In one non-limiting example, a force sensing device that includes one or more strain sensors may be incorporated into a display stack of an electronic device. The one or more strain sensors can be positioned in an area of the display stack that is visible to a user when the user is viewing the display. As such, the one or more transparent strain sensors can be formed with a transparent conductive material or two or more transparent conductive materials.

In some embodiments, each transparent strain sensitive element is formed or processed to have a first gauge factor and a first conductance. Each transparent strain signal line is formed or processed to have a different second gauge factor and a different first conductance. For example, in one embodiment the transparent material or materials that form a transparent strain sensitive element may have a higher gauge factor than the transparent material(s) of the at least one transparent strain signal line while the conductance of the transparent strain sensitive element may be less than the conductance of the transparent strain signal line(s). Thus, the transparent strain sensitive element is configured to be more sensitive to strain than the transparent strain signal line(s) and the transparent strain signal line(s) is configured to transmit signals more effectively.

In one aspect a transparent strain sensor includes a transparent strain sensitive element and a transparent strain signal line connected directly to the strain sensitive element. The transparent strain sensitive element is formed with comprised a first transparent conductive material having a first gauge factor. The transparent strain signal line is formed with a second transparent conductive material having a second gauge factor. The first gauge factor can be greater than the second gauge factor in one embodiment. Additionally or alternatively, the first transparent conductive material may have a first electrical resistance and the second transparent conductive material a second electrical resistance with the first electrical resistance being greater than the second electrical resistance. In a non-limiting example, the transparent strain sensitive element may be formed with a transparent GZO film or a transparent AZO film and the at least one transparent strain signal line is formed with a transparent ITO film.

In another aspect, a transparent strain sensor can be formed with a hybrid transparent conductive material that includes at least one first transparent conductive segment that has a first gauge factor and a first electrical resistance and at least one second transparent conductive segment that has a second gauge factor and a second electrical resistance. The first transparent conductive segment is connected to the second transparent conductive segment. The first gauge factor can be greater than the second gauge factor and the first electrical resistance greater than the second electrical resistance.

In another aspect, a transparent strain sensor can include a transparent strain sensitive element and at least one transparent strain signal line connected directly to the transparent strain sensitive element. The transparent strain sensitive element and transparent strain signal line(s) can be formed with the same a transparent conductive material or materials, but the transparent conductive material(s) in the strain sensitive element and/or in the at least one strain signal line may be doped with one or more dopants to change the gauge factor and/or the conductance of the transparent conductive material. Thus, the transparent strain sensitive element and the at least one transparent strain signal line can have different gauge factors and/or electrical conductance. In some embodiments, the gauge factor of the transparent strain sensitive element is greater than the gauge factor of the at least one strain signal line. Additionally or alternatively, the transparent strain sensitive element can have a first electrical resistance and the transparent strain signal line(s) a second overall electrical resistance where the first electrical resistance is greater than the second electrical resistance.

In yet another aspect, a method for producing a transparent strain sensor may include providing a transparent strain sensitive element on a substrate and providing a transparent strain signal line that is connected directly to the transparent strain sensitive element on the substrate. The transparent strain sensitive element is formed with one or more transparent conductive materials having a first gauge factor. The transparent strain signal line is formed with one or more transparent conductive materials having a different second gauge factor.

In another aspect, a method for producing a transparent strain sensor can include providing a transparent strain sensitive element on a substrate, where the transparent strain sensitive element comprises one or more transparent conductive materials, and providing a transparent strain signal line that is connected directly to the strain sensitive element on the substrate. The one or more transparent conductive materials of the transparent strain sensitive element is processed to increase a gauge factor of the transparent strain sensitive element. In one non-limiting example, the one or more transparent conductive materials may be can be laser annealed to increase the crystallinity of the transparent strain sensitive element, which results in a higher gauge factor. In some embodiments, the transparent strain signal line can also be formed with the same or different transparent conductive material(s), and the transparent conductive material(s) of the transparent strain signal line may be processed to increase a conductance of the transparent strain signal line.

In yet another aspect, a method for producing a transparent strain sensor may include providing a transparent strain sensitive element on a substrate and providing a transparent strain signal line that is connected directly to the strain sensitive element on the substrate. The transparent strain signal line is formed with one or more transparent conductive materials. The one or more transparent conductive materials of the transparent strain signal line can be processed to increase a conductance of the transparent strain signal line. In one non-limiting example, the one or more transparent conductive materials may be doped with a dopant or dopants that reduce the overall electrical resistance of the strain signal line, which in turn increases the conductance of the transparent strain signal line.

In yet another aspect, an electronic device can include a cover glass and a strain sensing structure positioned below the cover glass. The strain sensing structure may include a substrate, a first transparent strain sensitive element positioned on a first surface of the substrate and a second transparent strain sensitive element positioned on a second surface of the substrate. One or more transparent strain signal lines are connected to each transparent strain sensitive element. In some embodiments, the first and second transparent strain sensitive elements have a gauge factor that is greater than a gauge factor of the transparent strain signal lines. Sense circuitry is electrically connected to the transparent strain signal lines, and a controller is operably connected to the sense circuitry. The controller is configured to determine an amount of force applied to the cover glass based on the signals received from the sense circuitry. In some embodiments, the first and second transparent strain sensitive elements and the transparent strain signal lines are positioned in an area of the display stack that is visible to a user when the user is viewing the display.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
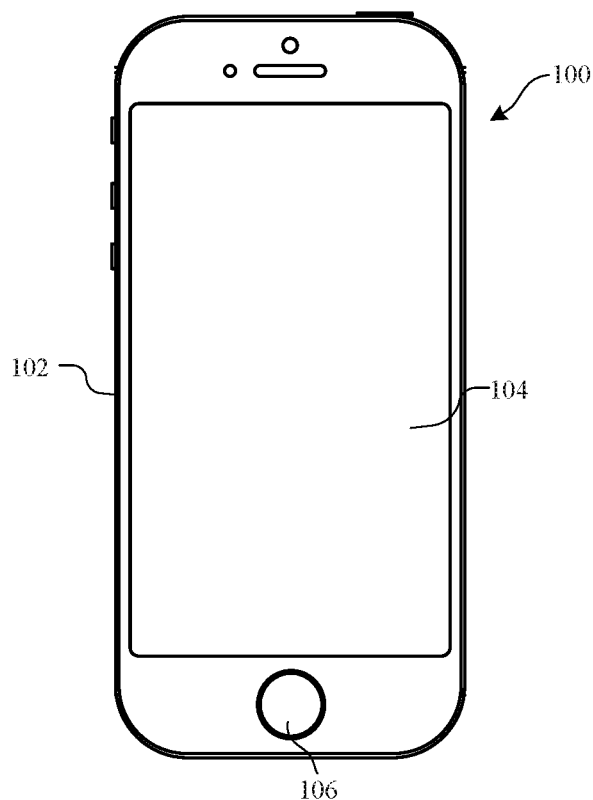
FIG. 1 depicts one example of an electronic device that can include one or more strain sensors.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to an electronic device that includes one or more strain sensors configured to detect strain based on an amount of force applied to the electronic device, a component in the electronic device, and/or an input region of the electronic device. As one example, the one or more strain sensors can be incorporated into a display stack of an electronic device, and at least a portion of the top surface of the display screen may be an input region. In some embodiments, the one or more transparent strain sensors are located in an area of the display stack that is visible to a user when the user is viewing the display. As used herein, the term "strain sensor" includes a strain sensitive element and at least one strain signal line physically or directly connected to the strain sensitive element. Additionally, "optically transparent" and "transparent" are defined broadly to include a material that is transparent, translucent, or not visibly discernable by the human eye.

In some embodiments, each strain sensitive element is formed or processed to have a first gauge factor and a first conductance. Each strain signal line is formed or processed to have a different second gauge factor and a different first conductance. For example, in one embodiment the material or materials that form a strain sensitive element may have a higher gauge factor than the material(s) of the at least one strain signal line while the conductance of the strain sensitive element may be less than the conductance of the strain signal line(s). Thus, the strain sensitive element is configured to be more sensitive to strain than the strain signal line(s) and the strain signal line(s) is configured to transmit signals more effectively. In a non-limiting example, the strain sensitive element may be formed with a transparent GZO film or a transparent AZO film and the at least one strain signal line formed with a transparent ITO film.

In some embodiments, a gauge factor and/or a conductance of a strain sensitive element or a strain signal line can be based at least in part on the structure and/or the operating conditions of the electronic device or a component in the electronic device that includes one or more strain sensors.

In another embodiment, a strain sensitive element and/or the one or more strain signal lines connected to the strain sensitive element may be processed after the strain sensitive elements and the strain signal line(s) are formed. In a non-limiting example, the material used to form the strain sensitive element and the strain signal line(s) can be the same material or materials, and the material(s) in the strain sensitive element and/or the material(s) in the strain signal lines is processed to adjust the conductance and/or the gauge factor of the processed component. In one embodiment, the strain sensitive element can be laser annealed to increase the crystallinity of the strain sensitive element, which results in a higher gauge factor. Additionally or alternatively, the one or more strain signal lines may be doped with a dopant or dopants that reduce the overall electrical resistance of the strain signal line(s), which in turn increases the conductance of the strain signal line(s).

And in yet another embodiment, one or more parameters of the fabrication process that is used to form the strain sensitive element and/or the strain signal line(s) may be adjusted to increase the gauge factor and/or the conductance of the component. For example, in one embodiment the flow rate of oxygen can be increased when the strain sensitive element is deposited onto the substrate. The higher oxygen flow rate can reduce the carrier concentration and/or mobility of the carriers in the strain sensitive element. In another embodiment, the thickness of the material used to form the strain sensitive element and/or the strain signal line(s) may be adjusted to increase the gauge factor or the conductance of the component.

Directional terminology, such as "top", "bottom", "front", "back", "leading", "trailing", etc., is used with reference to the orientation of the Figure(s) being described. Because components of embodiments described herein can be positioned in a number of different orientations, the directional terminology is used for purposes of illustration only and is in no way limiting. When used in conjunction with layers of a display or device, the directional terminology is intended to be construed broadly, and therefore should not be interpreted to preclude the presence of one or more intervening layers or other intervening features or elements. Thus, a given layer that is described as being formed, positioned, disposed on or over another layer, or that is described as being formed, positioned, disposed below or under another layer may be separated from the latter layer by one or more additional layers or elements.

These and other embodiments are discussed below with reference to FIGS. 1-15. However, those skilled in the art will readily appreciate that the detailed description given herein with respect to these Figures is for explanatory purposes only and should not be construed as limiting.

FIG. 1 shows one example of an electronic device that can include one or more strain sensors. In the illustrated embodiment, the electronic device 100 is implemented as a smart telephone. Other embodiments can implement the electronic device differently. For example, an electronic device can be a laptop computer, a tablet computing device, a wearable computing device, a smart watch, a digital music player, a display input device, a remote control device, and other types of electronic devices that include a strain sensor or sensors.

The electronic device 100 includes an enclosure 102 surrounding a display 104 and one or more input/output (I/O) devices 106 (shown as button). The enclosure 102 can form an outer surface or partial outer surface for the internal components of the electronic device 100, and may at least partially surround the display 104. The enclosure 102 can be formed of one or more components operably connected together, such as a front piece and a back piece. Alternatively, the enclosure 102 can be formed of a single piece operably connected to the display 104.

The display 104 can be implemented with any suitable display, including, but not limited to, a multi-touch sensing touchscreen device that uses liquid crystal display (LCD) technology, light emitting diode (LED) technology, organic light-emitting display (OLED) technology, or organic electro luminescence (OEL) technology.

In some embodiments, the I/O device 106 can take the form of a home button, which may be a mechanical button, a soft button (e.g., a button that does not physically move but still accepts inputs), an icon or image on a display, and so on. Further, in some embodiments, the button can be integrated as part of a cover glass of the electronic device. Although not shown in FIG. 1, the electronic device 100 can include other types of I/O devices, such as a microphone, a speaker, a camera, and one or more ports such as a network communication port and/or a power cord port.

Strain sensors can be included in one or more locations of the electronic device 100. For example, in one embodiment one or more strains sensors may be included in the I/O device 106. The strain sensor(s) can be used to measure an amount of force and/or a change in force that is applied to the I/O device 106. In another embodiment, one or more strain sensors can be positioned under at least a portion of the enclosure to detect a force and/or a change in force that is applied to the enclosure. Additionally or alternatively, one or more strains sensors may be included in a display stack for the display 104. The strain sensor(s) can be used to measure an amount of force and/or a change in force that is applied to the display or to a portion of the display. As described earlier, a strain sensor includes a strain sensitive element and at least one strain signal line physically or directly connected to the strain sensitive element.

Figure 2:
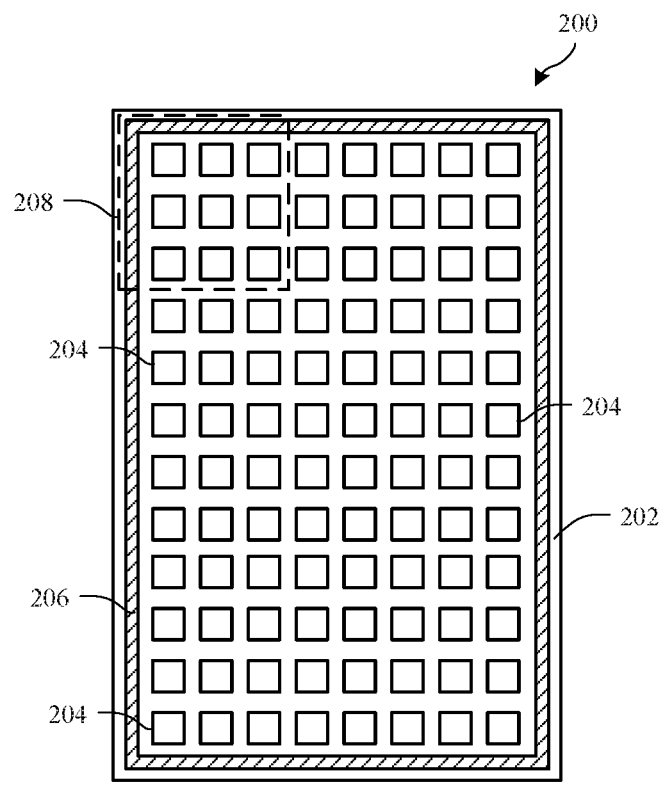
FIG. 2 depicts a plan view of an example strain sensitive structure that is suitable for use in a display stack of an electronic device.
Figure 3:
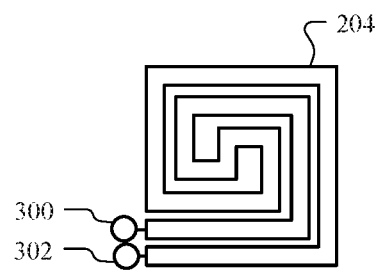
FIG. 3 depicts a plan view of one example of an optically transparent serpentine strain sensitive element which may be used in the example strain sensitive structure depicted in FIG. 2.

In one non-limiting example, the entire top surface of a display may be an input region that is configured to receive one or more force inputs from a user. FIG. 2 depicts a plan view of an example strain sensitive structure that is suitable for use in a display stack. The strain sensitive structure 200 can include a grid of independent optically transparent strain sensitive elements 204 that are formed in or on a substrate 202. The strain sensitive elements 204 may be formed in or on at least a portion of one or both surfaces of the substrate 202. The substrate 202 can be formed of any suitable material or materials. In one embodiment, the substrate 202 is formed with an optically transparent material, such as polyethylene terephthalate (PET).

As discussed earlier, the strain sensitive elements 204 are configured to detect strain based on an amount of force applied to an input region of the display. The strain sensitive elements 204 may be formed with a transparent conductive material or materials such as, for example, polyethyleneioxythiophene (PEDOT), a tin doped indium oxide (ITO) film, a gallium doped zinc oxide (GZO) film, an aluminum doped zinc oxide (AZO) film, carbon nanotubes, graphene, silver nanowire, other metallic nanowires, and the like. In certain embodiments, the strain sensitive elements 204 may be selected at least in part on temperature characteristics. For example, the material selected for transparent strain sensitive elements 204 may have a negative temperature coefficient of resistance such that, as temperature increases, the electrical resistance decreases.

In this example, the transparent strain sensitive elements 204 are formed as an array of rectilinear sensing elements, although other shapes and array patterns can also be used. In many examples, each individual strain sensitive element 204 may have a selected shape and/or pattern. For example, in certain embodiments, a strain sensitive element 204 may be deposited in a serpentine pattern, such as the pattern shown in FIG. 3. A strain sensitive element 204 can have a different pattern or configuration in other embodiments.

The strain sensitive element 204 may include at least two electrodes 300, 302 that are configured to be physically or directly connected to one or more strain signal lines (not shown). The strain signal line(s) can be connected to a conductive contact 206, which operably connects the strain sensitive element 204 to sense circuitry (not shown). The conductive contact 206 may be a continuous contact or can be formed in segments that surround or partially surround the array of strain sensitive elements 204. In other embodiments, a strain sensitive element 204 may be electrically connected to sense circuitry without the use of electrodes. For example, a strain sensitive element 204 may be connected to the sense circuitry using conductive traces that are formed as part of a film layer.

Figure 4:
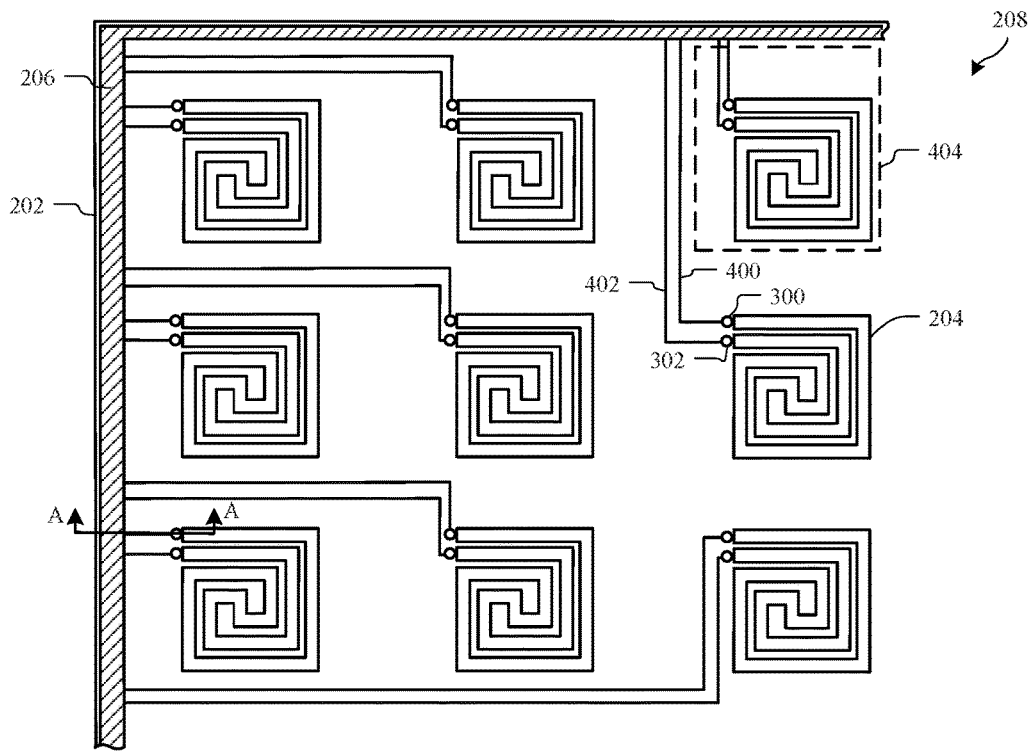
FIG. 4 is an enlarged view of the area shown in FIG. 2.

Referring now to FIG. 4, there is shown an enlarged view of the area 208 shown in FIG. 2. The electrodes 300, 302 of each strain sensitive element 204 are connected to the conductive contact 206 using strain signal lines 400, 402, respectively. Together the strain sensitive element 204 and the strain signal lines 400, 402 physically or directly connected to the strain sensitive element 204 form a strain sensor 404. In some embodiments, a gauge factor and/or a conductance of the strain sensitive element 204 and/or the strain signal line(s) 400, 402 can be based at least in part on the configuration of the strain sensitive structure 200, on the operating conditions of the electronic device, and/or on the operating conditions of the component (e.g., display) in the electronic device that includes one or more strain sensors.

Figure 5:
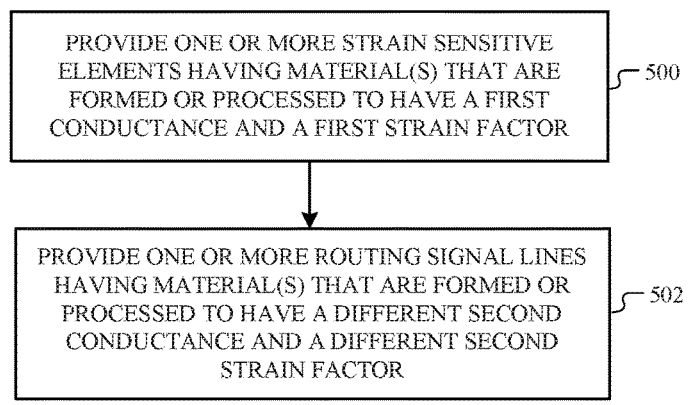
FIG. 5 is a flowchart of a first method for producing a strain sensor.

FIG. 5 is a flowchart of a first method for producing a strain sensor. Initially, one or more strain sensitive elements are provided that have a material or combination of materials that have been formed or processed to have a first conductance and a first gauge factor (block 500). Next, as shown in block 502, one or more strain signal lines that are directly connected to each strain sensitive element are provided, where the strain signal line(s) include a material or combination of materials that have been formed or processed to have a different second conductance and a different second gauge factor. Various embodiments of such strain sensitive elements and strain signal line(s) are described in more detail in conjunction with FIGS. 6-11.

In one embodiment, the material(s) of each strain sensitive element has a lower conductance than the conductance of the material(s) of the at least one strain signal line. For example, the material(s) of each strain sensitive element may have a higher electrical resistance than the material(s) of the at least one strain signal line. Additionally, the first gauge factor of the strain sensitive element is higher than the second gauge factor of the at least one strain signal line that is connected to the strain sensitive element. Thus, the strain sensitive element is more sensitive to strain than the strain signal line(s) and the strain signal line(s) is configured to transmit signals more effectively. In a non-limiting example, the strain sensitive element may be formed with a transparent GZO film or a transparent AZO film and the at least one strain signal line formed with a transparent ITO film.

Figure 6:
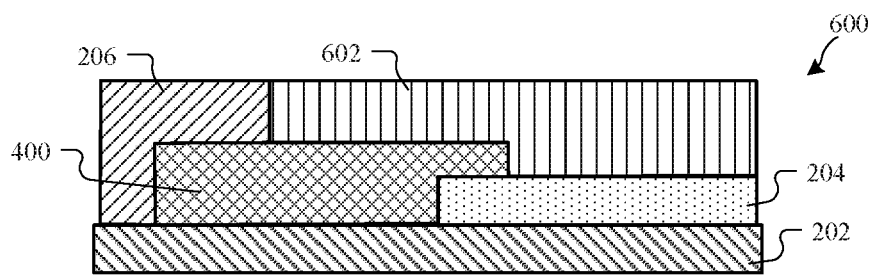
FIG. 6 is a simplified cross-sectional view taken along line A-A in FIG. 4 of a first strain sensitive structure that is suitable for use as the strain sensitive structure shown in FIG. 2.

Referring now to FIG. 6, there is shown a simplified cross-sectional view taken along line A-A in FIG. 4 of a first strain sensitive structure that is suitable for use as the strain sensitive structure 200 shown in FIG. 2. The strain sensitive structure 600 includes a strain sensitive element 204 disposed on a surface of the substrate 202. The strain sensitive element 204 is connected to at least one strain signal line 400. As described earlier, the strain sensitive element 204 is made of a material or combination of materials that has a first conductance and a first gauge factor and the at least one strain signal line 400 is made of a material or combination of materials having a different second conductance and a different second gauge factor.

The at least one strain signal line 400 is connected to the conductive contact 206. In some embodiments, the conductive contact is made of copper and is positioned in a non-visible area of an electronic device (e.g., in a non-visible area of a display). A dielectric or insulating layer 602 may be disposed over at least a portion of the at least one strain signal line 400 and the strain sensitive element 204. The insulating layer 602 may act as a protective layer for the strain signal line 400 and the strain sensitive element 204. In embodiments where the strain sensitive element and the strain signal line(s) are formed with a substantially transparent material or materials, the insulating layer 602 can be made of a material or combination of materials that has an index of refraction that substantially matches the index of refraction of the strain sensitive element 204 and/or the at least one strain signal line 400.

Figure 7:
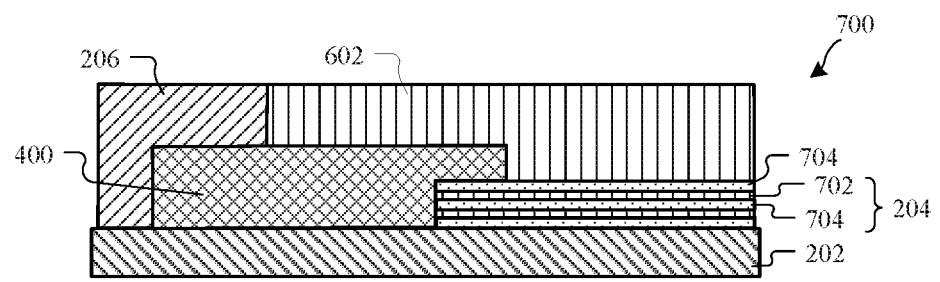
FIG. 7 is a simplified cross-sectional view taken along line A-A in FIG. 4 of a second strain sensitive structure that is suitable for use as the strain sensitive structure shown in FIG. 2.

FIG. 7 is a simplified cross-sectional view taken along line A-A in FIG. 4 of a second strain sensitive structure that is suitable for use as the strain sensitive structure 200 shown in FIG. 2. The strain sensitive structure 700 is similar to the strain sensitive structure 600 shown in FIG. 6, with the exception of the strain sensitive element 204. In the embodiment of FIG. 7, the strain sensitive element 204 is an alternating multi-layer transparent conductive structure that includes a layer of insulating material 702 positioned between two layers of conductive material 704. Each layer of conductive material 704 can be made of a material or combination of materials that has a first conductance and a first gauge factor. In some embodiments, the multi-layer structure of the strain sensitive element 204 is configured to have an overall electrical resistance that is lower than the strain sensitive element 204 in FIG. 6 (e.g., a solid layer of conductive material) while still providing a higher gauge factor. In one non-limiting example, each layer of transparent conductive material can be formed with a transparent GZO film or a transparent AZO film.

The strain signal line 400 that is connected to the strain sensitive element 204 can be formed with a material or combination of materials that has a conductance and a gauge factor that are different from the overall conductance and the gauge factor of the multi-layer structure of the strain sensitive element 204. As described earlier, the overall conductance of the strain sensitive element 204 may be less than the conductance of the strain signal line(s), while the gauge factor of the strain sensitive element 204 can be greater than the gauge factor of the strain signal line(s).

In the embodiments illustrated in FIGS. 6 and 7, the strain sensitive element has a higher gauge factor than the gauge factor of the at least one strain signal line connected to the strain sensitive element. The higher gauge factor allows the strain sensitive element to be more sensitive to strain than the strain signal line(s). Additionally, in some embodiments the electrical conductance of the strain signal line(s) is higher than the conductance of the strain sensitive element. Due to the higher conductance, the strain signal line or lines efficiently transmit signals produced by the strain sensitive element to the conductive contact 206.

Figure 8:
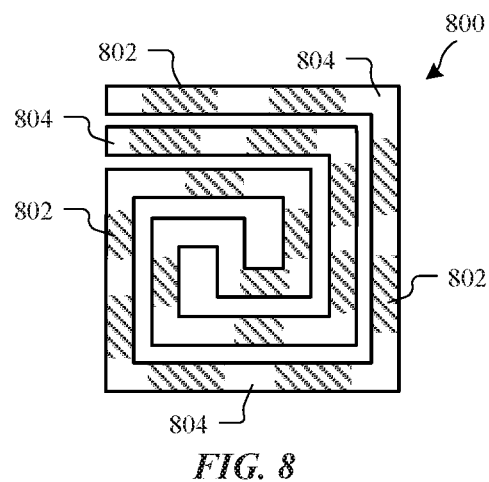
FIG. 8 is a plan view of a third example of a strain sensitive element that is suitable for use as the strain sensitive element shown in FIGS. 2 and 4.

Referring now to FIG. 8, there is shown a plan view of a third example of a strain sensitive element that is suitable for use as the strain sensitive element 204 shown in FIGS. 2 and 4. The strain sensitive element 800 is a hybrid strain sensitive element that is formed with two or more materials having different properties. In the illustrated embodiment, one segment 802 in the hybrid strain sensitive element 800 is made of a first conductive material that has a first conductance and first gauge factor and another segment 804 is made of a second conductive material that has a different second conductance and a different second gauge factor, where the first conductance is greater than the second conductance and the second gauge factor is greater than the first gauge factor.

The one or more strain signal lines that are directly connected to the hybrid strain sensitive element is formed or processed to have a gauge factor and a conductance that is different from the overall gauge factor and overall conductance of the strain sensitive element. For example, the strain sensitive element has a greater overall gauge factor than the gauge factor of the at least one strain signal line. The higher overall gauge factor allows the strain sensitive element to be more sensitive to strain than the strain signal line(s). Additionally, in some embodiments the electrical conductance of the strain signal line(s) is higher than the overall conductance of the strain sensitive element. Based on the higher conductance, the strain signal line(s) can effectively transmit signals produced by the strain sensitive element to the conductive contact 206 (see FIGS. 2 and 4).

The segments 802, 804 can have the same dimensions or one segment (e.g., segment 802) can have dimensions that are different from the dimensions of the other segment (e.g., segment 804). For example, one segment can be longer than another segment, which may result in a given gauge factor and/or conductance. In some embodiments, the given gauge factor can be a gauge factor that is equal to or greater than a threshold gauge factor. The given gauge factor and/or conductance can be based at least in part on the structure and/or operating conditions of the electronic device or a component in the electronic device that includes one or more hybrid strain sensors. In one embodiment, at least two same segments (e.g., at least two segments 802) can have different dimensions. Thus, at least one segment 802 can have dimensions that differ from another segment 802 and/or at least one segment 804 can have dimensions that differ from another segment 804. In another embodiment, all of the segments can have different dimensions. And in some embodiments, the hybrid strain sensitive element 800 may be formed with three or more materials having different properties.

The embodiments of a strain sensor shown in FIGS. 6-8 are formed with two or more different materials. The materials are selected for a given gauge factor and/or an electrical conductance. Other embodiments can produce a strain sensor by processing either the strain sensitive elements and/or the one or more strain signal lines connected to the strain sensitive elements after the strain sensitive elements and the strain signal line(s) are formed. For example, in some embodiments the material used to form the strain sensitive elements and the strain signal lines is the same material, and the strain sensitive elements and/or the strain signal lines are processed to adjust the conductance and/or the gauge factor of the processed component. The methods depicted in FIGS. 9 and 10 process the strain sensitive element and the strain signal line(s) respectively.

Figure 9:
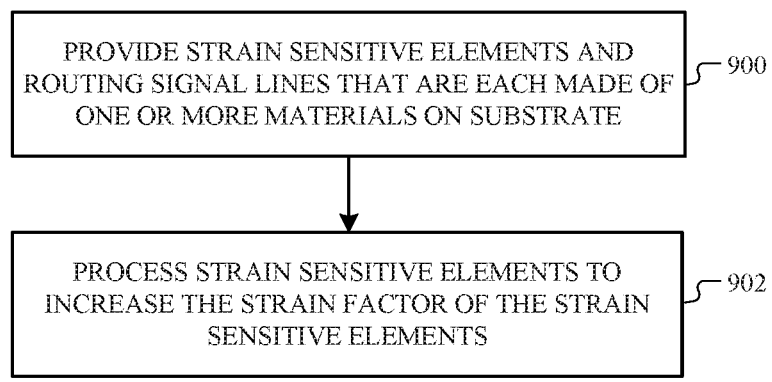
FIG. 9 is a flowchart of a second method for producing a strain sensor.

FIG. 9 is a flowchart of a second method for producing a strain sensor. Initially, as shown in block 900, the strain sensitive element and the strain signal line(s) that is connected to the strain sensitive element are provided. Both the strain sensitive element and the strain signal line(s) are formed with one or more suitable materials. As described earlier, in some embodiments the strain sensitive element and the one or more strain signal lines are formed with the same material, such as, for example, a transparent conducting oxide film. Next, as shown in block 902, the strain sensitive element is processed to increase the gauge factor of the strain sensitive element. The strain sensitive element may be processed using any suitable technique that increases the gauge factor of the strain sensitive element. For example, in one embodiment the strain sensitive element is laser annealed to increase the crystallinity of the strain sensitive element, which results in a higher gauge factor.

Figure 10:
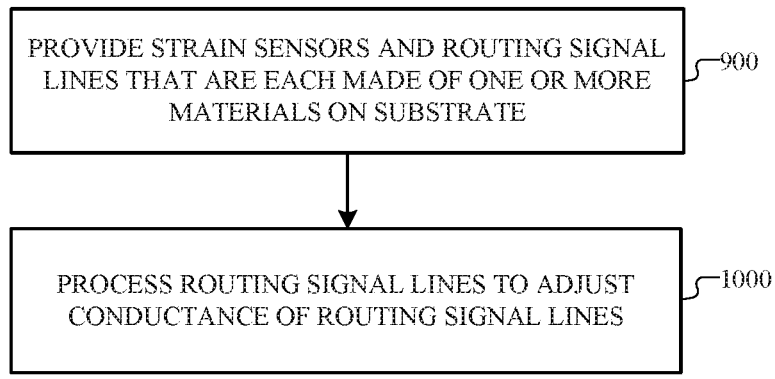
FIG. 10 is a flowchart of a third method for producing a strain sensor.

FIG. 10 is a flowchart of a third method for producing a strain sensor. Initially, as shown in block 900, the strain sensitive element and the strain signal line(s) that is connected to the strain sensitive element are provided. Both the strain sensitive element and the strain signal line(s) are formed with one or more suitable materials. As described earlier, in some embodiments the strain sensitive element and the one or more strain signal lines are formed with the same material, such as, for example, a transparent conducting oxide film.

Next, as shown in block 1000, the strain signal line(s) are processed to increase the conductance of the one or more strain signal lines. The strain signal line(s) may be processed using any suitable technique that increases the conductance of the strain signal line(s). For example, in one embodiment the one or more strain signal lines are doped with a dopant or dopants that reduce the overall electrical resistance of the strain signal line(s), which in turn increases the conductance of the strain signal line(s). For example, the one or more dopants can be diffused into the strain signal line(s) to increase the conductance of the strain signal line(s).

Figure 11:
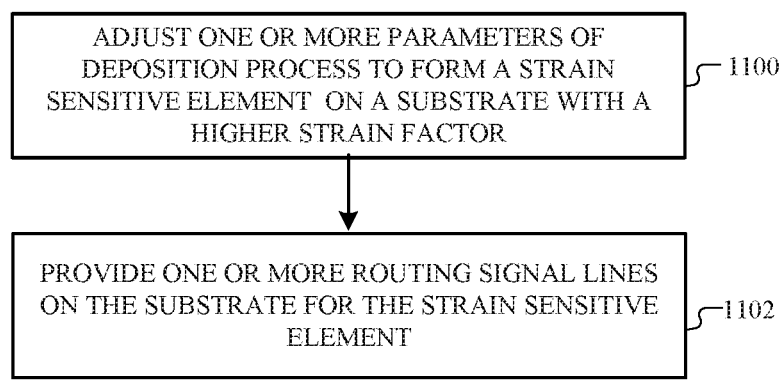
FIG. 11 is a flowchart of a fourth method for producing a strain sensor.

In still other embodiments, one or more parameters of the fabrication process that is used to form the strain sensitive elements and/or the strain signal line(s) can be adjusted to increase the gauge factor and/or the conductance of the component. FIG. 11 is a flowchart of a fourth exemplar method for producing a strain sensor. Initially, one or more parameters of the process used to form a strain sensitive element on a substrate is adjusted to produce a strain sensitive element that has a higher gauge factor. For example, in one embodiment the flow rate of oxygen is increased when the strain sensitive element is deposited onto the substrate. The higher oxygen flow rate can reduce the carrier concentration and/or mobility of the carriers in the strain sensitive element. In another embodiment, the thickness of the material used to form the strain sensitive element is adjusted to increase the gauge factor and/or to reduce the electrical resistance of the strain sensitive element. For example, the material in a strain sensitive element can be formed as a thinner layer to result in a lower resistivity.

Next, as shown in block 1102, one or more strain signal lines are formed on the substrate and connected to the strain sensitive element. One or more parameters of the fabrication process used to form the strain signal line(s) may be altered to increase the conductance of the strain signal line(s). Additionally or alternatively, the one or more strain signal lines can be processed after formation to increase the conductance of the strain signal line(s).

In some embodiments, a full sheet of a transparent conducting oxide film can be formed over and extend across the surface of a substrate (e.g., substrate 202 in FIG. 2) and select regions or areas of the film processed to produce the strain sensitive elements and/or the strain signal lines. For example, a mask can be formed over a transparent conducting oxide film, where select areas of the mask that correspond to the locations of the strain sensitive elements are removed. The exposed select regions of the transparent conducting oxide film can then be doped to produce the strain sensitive elements in the full sheet of the transparent conducting oxide film. The dopant or dopants can be selected to produce strain sensitive elements that have a given gauge factor, or that have a gauge factor that is equal to or greater than a threshold gauge factor. Similarly, select areas of a mask that correspond to the locations of the strain signal lines can be removed, and the exposed select regions of the transparent conducting oxide film can be doped to produce the strain signal lines in the full sheet of the transparent conducting oxide film. The dopant or dopants can be selected to produce strain signal lines that have a given conductance, or that have a conductance that is equal to or greater than a threshold conductance.

In other embodiments, two or more sheets of a transparent conducting oxide film can be formed over the surface of a substrate (e.g., substrate 202 in FIG. 2) and select regions or areas of the films processed to produce the strain sensitive elements and/or the strain signal lines. For example, one mask having openings that correspond to the locations of the strain sensitive elements can be formed over at least a portion of a transparent conducting oxide film. The exposed regions of the transparent conducting oxide film can then be doped to produce the strain sensitive elements in the full sheet of the transparent conducting oxide film. A second mask can be formed over at least a portion of a sheet of a conducting oxide film. The second mask can have openings at locations that correspond to the locations of the strain signal lines. The exposed select regions of the transparent conducting oxide film can be doped to produce the strain signal lines.

Figure 12:
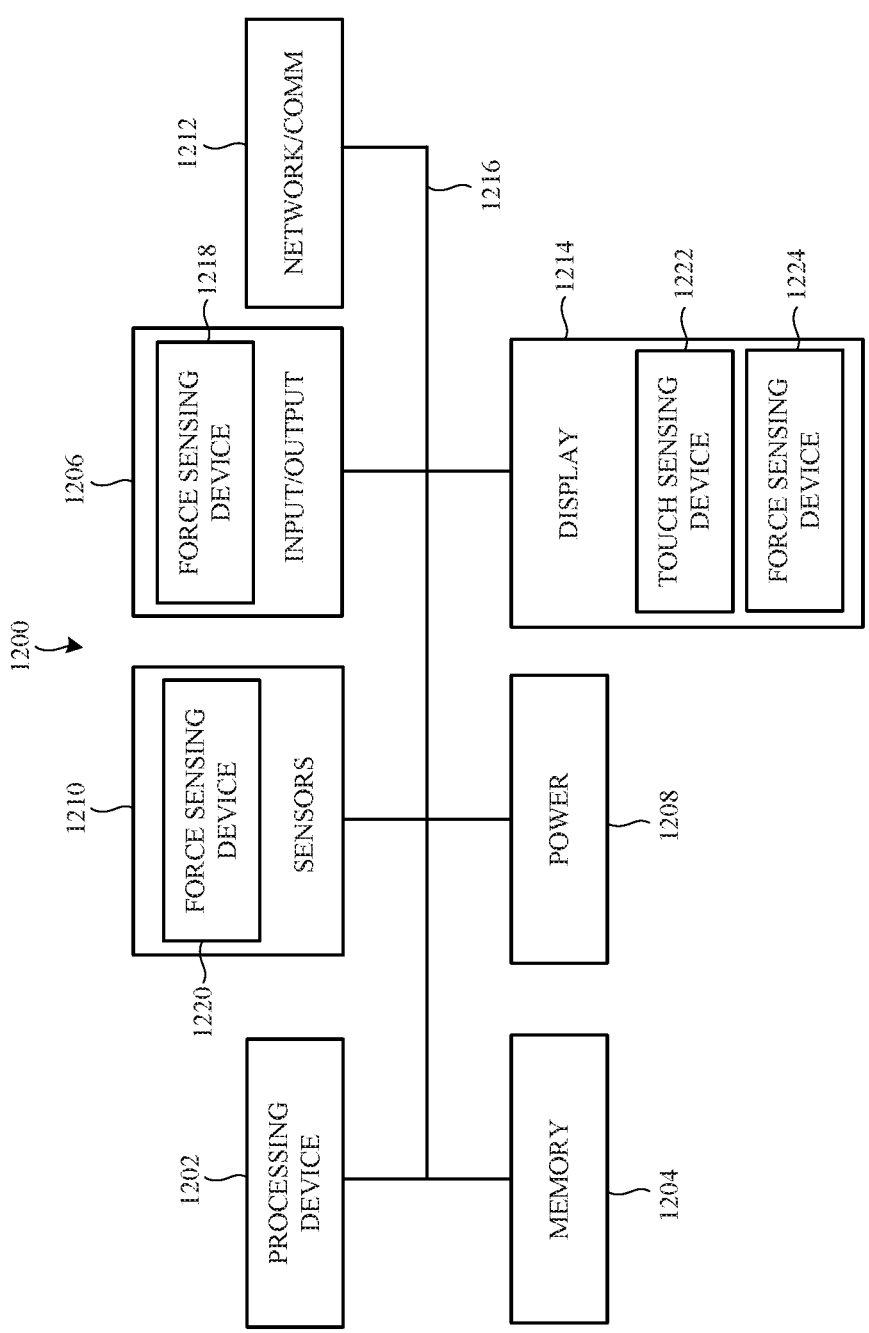
FIG. 12 is a illustrative block diagram of an electronic device that can include one or more strain sensors.

Referring now to FIG. 12, there is shown an illustrative block diagram of an electronic device that can include one or more strain sensors. As discussed earlier, one or more strain sensors can be located on a variety of components and/or at one or more different locations in an electronic device to detect a force applied on the component or on the electronic device. The illustrated electronic device 1200 can include one or more processing devices 1202, memory 1204, one or more input/output (I/O) devices 1206, a power source 1208, one or more sensors 1210, a network communication interface 1212, and a display 1214, each of which will be discussed in more detail.

The one or more processing devices 1202 can control some or all of the operations of the electronic device 1200. The processing device(s) 1202 can communicate, either directly or indirectly, with substantially all of the components of the device. For example, one or more system buses 1216 or other communication mechanisms can provide communication between the processing device(s) 1202, the memory 1204, the I/O device(s) 1206, the power source 1208, the one or more sensors 1210, the network communication interface 1212, and/or the display 1214. At least one processing device can be configured to determine an amount of force and/or a change in force applied to an I/O device 1206, the display, and/or the electronic device 1200 based on a signal received from one or more strain sensors.

The processing device(s) 1202 can be implemented as any electronic device capable of processing, receiving, or transmitting data or instructions. For example, the one or more processing devices 1202 can be a microprocessor, a central processing unit (CPU), an application-specific integrated circuit (ASIC), a digital signal processor (DSP), or combinations of multiple such devices. As described herein, the term "processing device" is meant to encompass a single processor or processing unit, multiple processors, multiple processing units, or other suitably configured computing element or elements.

The memory 1204 can store electronic data that can be used by the electronic device 1200. For example, the memory 1204 can store electrical data or content such as audio files, document files, timing and control signals, operational settings and data, and image data. The memory 1204 can be configured as any type of memory. By way of example only, memory 1204 can be implemented as random access memory, read-only memory, Flash memory, removable memory, or other types of storage elements, in any combination.

The one or more I/O devices 1206 can transmit and/or receive data to and from a user or another electronic device. Example I/O device(s) 1206 include, but are not limited to, a touch sensing device such as a touchscreen or track pad, one or more buttons, a microphone, a haptic device, a speaker, and/or a force sensing device 1218. The force sensing device 1218 can include one or more strain sensors. The strain sensor(s) can be configured as one of the strain sensors discussed earlier in conjunction with FIGS. 2-11.

As one example, the I/O device 106 shown in FIG. 1 may include a force sensing device 1218. As described earlier, the force sensing device 1218 can include one or more strain sensors that are configured according to one of the embodiments shown in FIGS. 2-11. An amount of force that is applied to the I/O device 106, and/or a change in an amount of applied force can be determined based on the signal(s) received from the strain sensor(s).

The power source 1208 can be implemented with any device capable of providing energy to the electronic device 1200. For example, the power source 1208 can be one or more batteries or rechargeable batteries, or a connection cable that connects the electronic device to another power source such as a wall outlet.

The electronic device 1200 may also include one or more sensors 1210 positioned substantially anywhere on or in the electronic device 1200. The sensor or sensors 1210 may be configured to sense substantially any type of characteristic, such as but not limited to, images, pressure, light, heat, touch, force, temperature, humidity, movement, relative motion, biometric data, and so on. For example, the sensor(s) 1210 may be an image sensor, a temperature sensor, a light or optical sensor, an accelerometer, an environmental sensor, a gyroscope, a magnet, a health monitoring sensor, and so on. In some embodiments, the one or more sensors 1210 can include a force sensing device that includes one or more strain sensors. The strain sensor(s) can be configured as one of the strain sensors discussed earlier in conjunction with FIGS. 2-11.

As one example, the electronic device shown in FIG. 1 may include a force sensing device 1220 in or under at least a portion of the enclosure 102. The force sensing device 1220 can include one or more strain sensors that may be configured as one of the strain sensors discussed earlier in conjunction with FIGS. 2-11. An amount of force that is applied to the enclosure 102, and/or a change in an amount of applied force can be determined based on the signal(s) received from the strain sensor(s).

The network communication interface 1212 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, infrared, RFID, Ethernet, and NFC.

The display 1214 can provide a visual output to the user. The display 1214 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. In some embodiments, the display 1214 can function as an input device that allows the user to interact with the electronic device 1200. For example, the display can include a touch sensing device 1222. The touch sensing device 1222 can allow the display to function as a touch or multi-touch display.

Additionally or alternatively, the display 1214 may include a force sensing device 1224. In some embodiments, the force sensing device 1224 is included in a display stack of the display 1214. The force sensing device 1224 can include one or more strain sensors. An amount of force that is applied to the display 1214, or to a cover glass disposed over the display, and/or a change in an amount of applied force can be determined based on the signal(s) received from the strain sensor(s). The strain sensor(s) can be configured as one of the strain sensors discussed earlier in conjunction with FIGS. 2-11.

It should be noted that FIG. 12 is exemplary only. In other examples, the electronic device may include fewer or more components than those shown in FIG. 12. Additionally or alternatively, the electronic device can be included in a system and one or more components shown in FIG. 12 is separate from the electronic device but in communication with the electronic device. For example, an electronic device may be operatively connected to, or in communication with a separate display. As another example, one or more applications or data can be stored in a memory separate from the electronic device. In some embodiments, the separate memory can be in a cloud-based system or in an associated electronic device.

Figure 13:
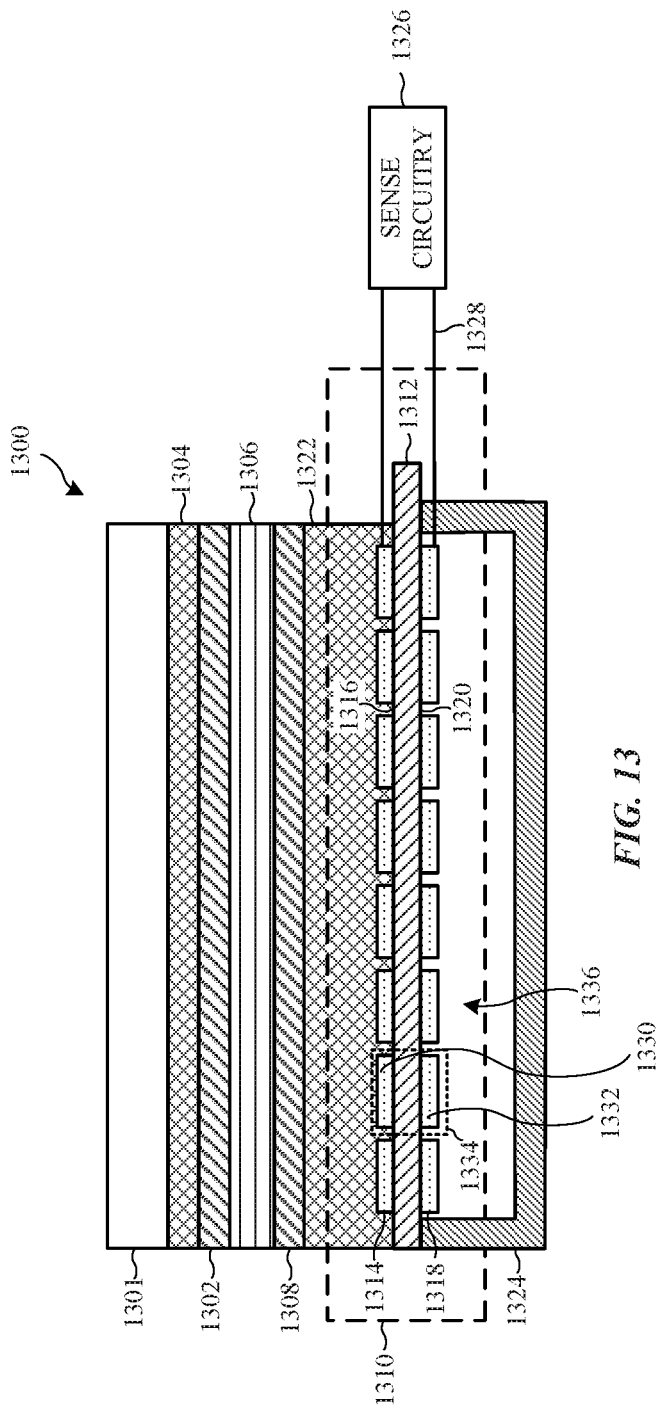
FIG. 13 is a cross-sectional view of an example display stack that includes strain sensors.

As described earlier, a force sensing device that includes one or more strain sensors can be included in a display stack of a display (e.g., display 104 in FIG. 1). FIG. 13 depicts a cross-sectional view of an example display stack that includes strain sensors. The display stack 1300 includes a cover glass 1301 positioned over a front polarizer 1302. The cover glass 1301 can be a flexible touchable surface that is made of any suitable material, such as, for example, glass, plastic, sapphire, or combinations thereof. The cover glass 1301 can act as an input region for a touch sensing device and a force sensing device by receiving touch and force inputs from a user. The user can touch and/or apply force to the cover glass 1301 with one or more fingers or with another element such as a stylus.

An adhesive layer 1304 can be disposed between the cover glass 1301 and the front polarizer 1302. Any suitable adhesive can be used for the adhesive layer, such as, for example, an optically clear adhesive. A display layer 1306 can be positioned below the front polarizer 1302. As described previously, the display layer 1306 may take a variety of forms, including a liquid crystal display (LCD), a light-emitting diode (LED) display, and an organic light-emitting diode (OLED) display. In some embodiments, the display layer 1306 can be formed from glass or have a glass substrate. Embodiments described herein include a multi-touch touchscreen LCD display layer.

Additionally, the display layer 1306 can include one or more layers. For example, a display layer 1306 can include a VCOM buffer layer, a LCD display layer, and a conductive layer disposed over and/or under the display layer. In one embodiment, the conductive layer may comprise an indium tin oxide (ITO) layer.

A rear polarizer 1308 may be positioned below the display layer 1306, and a strain sensitive structure 1310 below the rear polarizer 1308. The strain sensitive structure 1310 includes a substrate 1312 having a first set of independent transparent strain sensors 1314 on a first surface 1316 of the substrate 1312 and a second set of independent transparent strain sensors 1318 on a second surface 1320 of the substrate 1312. In the illustrated embodiment, the first and second sets of transparent strain sensors are located in an area of the display stack that is visible to a user. As described earlier, a strain sensor includes a strain sensitive element and the one or more strain signal lines physically or directly connected to the strain sensitive element. In the illustrated embodiment, the first and second surfaces 1316, 1320 are opposing top and bottom surfaces of the substrate 1312, respectively. An adhesive layer 1322 may attach the substrate 1312 to the rear polarizer 1308.

As described earlier, the strain sensors may be formed as an array of rectilinear strain sensors. Each strain sensitive element in the first set of independent strain sensors 1314 is aligned vertically with a respective one of the strain sensitive elements in the second set of independent strain sensors 1318. In many embodiments, each individual strain sensitive element may take a selected shape. For example, in certain embodiments, the strain sensitive elements may be deposited in a serpentine pattern, similar to the serpentine pattern shown in FIG. 3.

A back light unit 1324 can be disposed below (e.g., attached to) the strain sensitive structure 1310. The back light unit 1324 may be configured to support one or more portions of the substrate 1312 that do not include strain sensitive elements. For example, as shown in FIG. 13, the back light unit 1324 can support the ends of the substrate 1312. Other embodiments may configure a back light unit differently.

The strain sensors are typically connected to sense circuitry 1326 through conductive connectors 1328. The sense circuitry 1326 is configured to detect changes in an electrical property of each of the strain sensitive elements. In this example, the sense circuitry 1326 may be configured to detect changes in the electrical resistance of the strain sensitive elements, which can be correlated to a force that is applied to the cover glass 1301. In some embodiments, the sense circuitry 1326 may also be configured to provide information about the location of a touch based on the relative difference in the change of electrical resistance of the strain sensors 1314, 1318.

Figure 14:
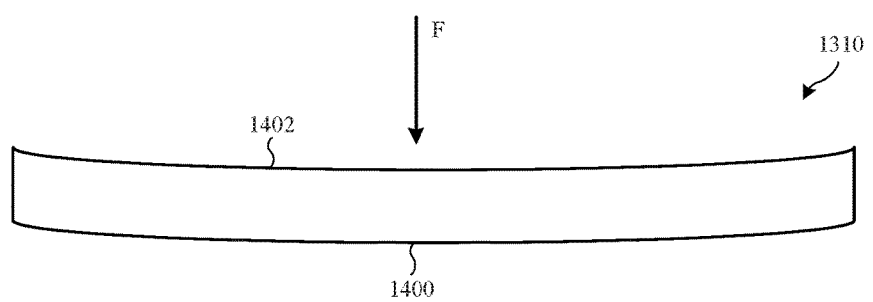
FIG. 14 is a simplified cross-sectional view of the strain sensitive structure responding to force.

As described earlier, in some embodiments the strain sensitive elements are formed with a transparent conducting oxide film. When a force is applied to an input region (e.g., the cover glass 1301), the planar strain sensitive structure 1310 is strained and the electrical resistance of the transparent conducting oxide film changes in proportion to the strain. As shown in FIG. 14, the force can cause the strain sensitive structure 1310 to bend slightly. The bottom surface 1400 of the strain sensitive structure 1310 elongates while the top surface 1402 compresses. The strain sensitive elements measure the elongation or compression of the surface, and these measurements can be correlated to the amount of force applied to the input region.

Two vertically aligned strain sensitive elements (e.g., 1330 and 1332) form a strain sensing device 1334. The sense circuitry 1326 may be adapted to receive signals from each strain sensing device 1334 and determine a difference in an electrical property of each strain sensing device. For example, as described above, a force may be received at the cover glass 1301, which in turn causes the strain sensitive structure 1310 to bend. The sense circuitry 1326 is configured to detect changes in an electrical property (e.g., electrical resistance) of the one or more strain sensing devices based on signals received from the strain sensing device(s) 1334, and these changes are correlated to the amount of force applied to the cover glass 1301.

In the illustrated embodiment, a gap 1336 exists between the strain sensitive structure 1310 and the back light unit 1324. Strain measurements intrinsically measure the force at a point on the top surface 1316 of the substrate 1312 plus the force from the bottom at that point on the bottom surface 1320 of the substrate 1312. When the gap 1336 is present, there are no forces on the bottom surface 1320. Thus, the forces on the top surface 1316 can be measured independently of the forces on the bottom surface 1320. In alternate embodiments, the strain sensitive structure 1310 may be positioned above the display layer when the display stack 1300 does not include the gap 1336.

Other embodiments can configure a strain sensitive structure differently. For example, a strain sensitive structure can include only one set of strain sensitive elements on a surface of the substrate. A processing device may be configured to determine an amount of force, or a change in force, applied to an input region based on signals received from the set of strain sensitive elements.

Figure 15:
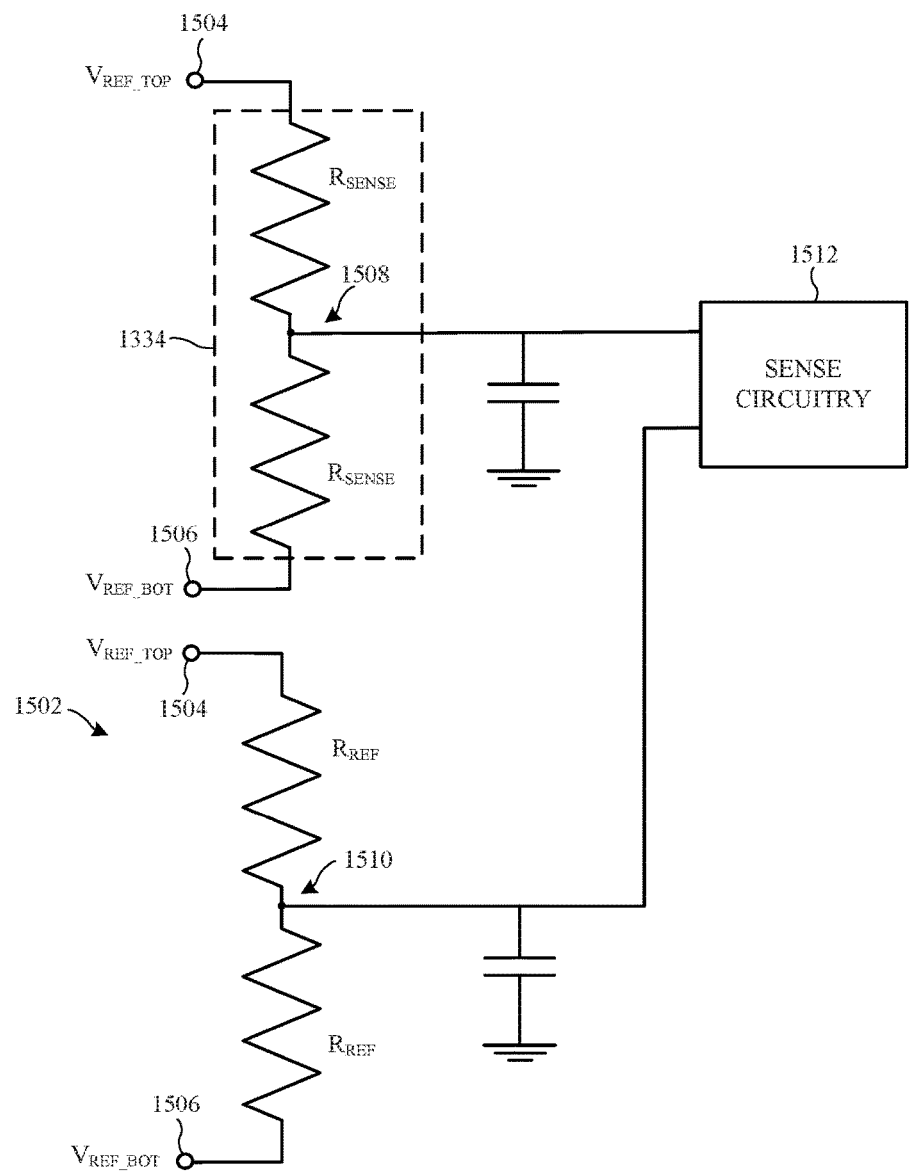
FIG. 15 is a simplified schematic diagram of sense circuitry operably connected to a strain sensor.

Referring now to FIG. 15, there is shown a simplified schematic diagram of sense circuitry operably connected to a strain sensing device. The strain sensing device 1334 (see FIG. 13) that includes two-vertically aligned strain sensitive elements can be modeled as two resistors $R_{SENSE}$ configured as a voltage divider. A reference voltage divider 1502 includes two reference resistors $R_{REF}$. As one example, the strain sensing device 1334 and the reference voltage divider 1502 may be modeled as a Wheatstone bridge circuit, with the strain sensing device 1334 forming one half bridge of the Wheatstone bridge circuit and the reference voltage divider 1502 forming the other half bridge of the Wheatstone bridge circuit. Other embodiments can model the strain sensor and the reference resistors differently. For example, a strain sensitive structure may include only one set of strain sensitive elements and a particular strain sensitive element and a reference resistor can be modeled as a Wheatstone half bridge circuit.

A first reference voltage ($V_{REF\_TOP}$) is received at node 1504 and a second reference voltage ($V_{REF\_BOT}$) is received at node 1506. A force signal at node 1508 of the strain sensing device 1334 and a reference signal at node 1510 of the reference voltage divider 1502 are received by the sense circuitry 1512. The sense circuitry 1512 is configured to detect changes in an electrical property (e.g., electrical resistance) of the strain sensing device 1334 based on the differences in the force and reference signals of the two voltage dividers. The changes can be correlated to the amount of force applied to a respective input region of an electronic device (e.g., the cover glass 1201 in FIG. 12).

Various embodiments have been described in detail with particular reference to certain features thereof, but it will be understood that variations and modifications can be effected within the spirit and scope of the disclosure. For example, the one or more strain sensitive elements can be formed with a non-metal opaque material. Additionally or alternatively, the one or more strain sensitive elements can be formed on one layer and the strain signal line(s) on another layer such that a strain sensitive element and corresponding strain signal line(s) are not co-planar (on different planar surfaces). A via can be formed through the interposing layer or layers to produce an electrical contact between the strain sensitive element and the strain signal lines.

Even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

What is claimed is:

1. A strain sensor positioned in a display stack of an electronic device, the strain sensor comprising:
   a strain sensitive element comprised of a first conductive material having a first gauge factor;
   a strain signal line connected to the strain sensitive element and comprised of a different second conductive material having a second gauge factor, wherein the first gauge factor is greater than the second gauge factor.

2. The strain sensor of claim 1, wherein the first conductive material has a first electrical resistance, the second conductive material has a second electrical resistance, and the first electrical resistance is greater than the second electrical resistance.

3. The strain sensor of claim 1, wherein the first conductive material and the second conductive material each comprise a conducting oxide film.

4. The strain sensor of claim 3, wherein the first conductive material comprises one of a gallium doped zinc oxide film and an aluminum doped zinc oxide film.

5. The strain sensor of claim 3, wherein the second conductive material comprises an indium tin oxide film.

6. The strain sensor of claim 3, wherein the first conductive material comprises a multi-layer conductive structure that includes an insulating layer disposed between two conducting oxide films.

7. The strain sensor of claim 1, wherein the first conductive material in the strain sensitive element is processed to produce the first gauge factor.

8. A strain sensor positioned in a display stack of an electronic device, the strain sensor comprising:
   a strain sensitive element comprising a hybrid conductive material that includes:
      a first conductive segment having a first gauge factor and a first electrical resistance; and
      a second conductive segment connected to the first conductive segment, the second conductive segment having a second gauge factor and a second electrical resistance, wherein the first gauge factor is different than the second gauge factor and the first electrical resistance is different than the second electrical resistance.

9. The strain sensor of claim 8, further comprising at least one strain signal line connected directly to the strain sensitive element, wherein the at least one signal line has a third gauge factor and a third electrical resistance, wherein the third electrical resistance is less than the first and the second electrical resistances.

10. The strain sensor of claim 8, wherein a dimension of the first conductive segment is different than a dimension of the second conductive segment.

11. The strain sensor of claim 10, wherein the first conductive segment is longer than the second conductive segment.

12. An electronic device, comprising:
a display stack for a display, comprising:
a cover glass; and
a strain sensing structure positioned below the cover glass, the strain sensing structure comprising:
a substrate;
a first strain sensitive element positioned on a first surface of the substrate;
a second strain sensitive element positioned on a second surface of the substrate; and
one or more strain signal lines connected directly to each strain sensitive element, wherein the first and the second strain sensitive elements have a gauge factor that is greater than a gauge factor of the strain signal lines;
sense circuitry electrically connected to the strain signal lines; and
a controller operably connected to the sense circuitry and configured to determine an amount of force applied to the cover glass based on signals received from the sense circuitry.

13. The electronic device of claim 12, wherein the first and the second strain sensitive elements are each comprised of one of a gallium doped zinc oxide film and an aluminum doped zinc oxide film and the strain signal lines are comprised of an indium tin oxide film.

14. The electronic device of claim 12, wherein the first surface of the substrate is opposite the second surface of the substrate.

15. The electronic device of claim 12, wherein the first and the second strain sensitive elements comprise a conducting oxide film.

16. The electronic device of claim 12, wherein the display stack further comprises a gap adjacent the second surface of the substrate.

17. The strain sensor of claim 2, wherein the second conductive material in the strain signal line is processed to produce the second electrical resistance.

18. The strain sensor of claim 17, wherein the second conductive material is doped with one or more dopants to produce the second electrical resistance.

19. The strain sensor of claim 18, wherein the first conductive material in the strain sensitive element is laser annealed to produce the first gauge factor.

* * * * *